United States Patent [19]

Jonsson

[11] Patent Number: 4,709,737
[45] Date of Patent: Dec. 1, 1987

[54] DEBARKING TOOL AND ARM COMBINATION

[76] Inventor: Karl-Erik A. Jonsson, Floraplan 14, S-802 28 Gävle, Sweden

[21] Appl. No.: 911,966

[22] Filed: Sep. 26, 1986

[51] Int. Cl.⁴ ............................................. B27L 1/00
[52] U.S. Cl. .................................. 144/241; 144/227; 144/208 E; 407/48; 407/114
[58] Field of Search .................. 407/48, 49, 102, 103, 407/113, 114, 115, 116; 144/208 E, 226, 227, 218, 241; 83/836

[56] References Cited

U.S. PATENT DOCUMENTS

| Re. 2,728 | 8/1867 | Newton | 144/227 |
| 13,096 | 6/1855 | Newton | 144/227 |
| 553,280 | 1/1896 | Dupes | 144/227 |
| 1,490,745 | 4/1924 | Johnston | 144/227 |
| 4,209,047 | 6/1980 | Weill | 407/48 |
| 4,231,406 | 11/1980 | Jonsson | 144/241 |
| 4,425,951 | 1/1984 | Pousette et al. | 144/208 E |
| 4,503,893 | 3/1985 | Demopoulos | 144/241 |

Primary Examiner—W. D. Bray
Attorney, Agent, or Firm—Birch, Stewart, Kolasch, & Birch

[57] ABSTRACT

A debarking device comprising a debarking arm with a debarking tool mounted to the end thereof. The debarking tool has a curved bearing surface and the debarking arm is provided with a curved recessed seat for receiving the debarking tool. The bearing surface of the debarking tool and the recessed seat of the arm are provided with guides for allowing guided adjustments in the orientation of the debarking tool relative to the debarking arm. Further, the debarking device includes a fastener for retaining and locking the debarking tool at a desired adjusted orientation with respect to the arm.

31 Claims, 12 Drawing Figures

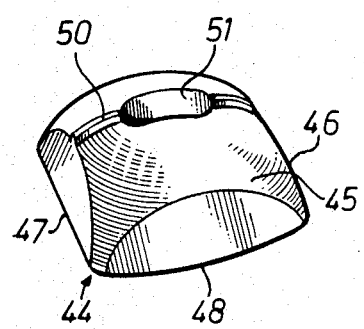
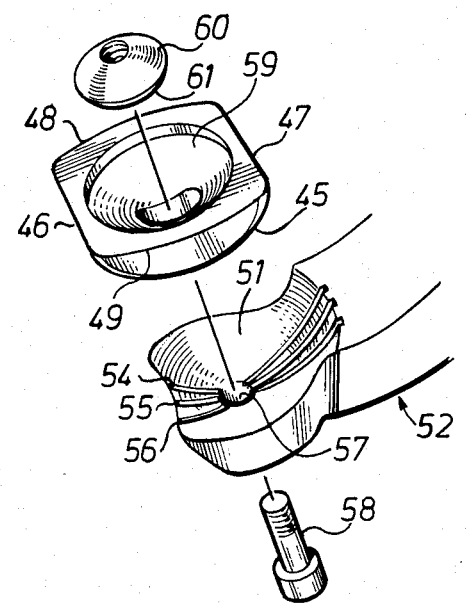
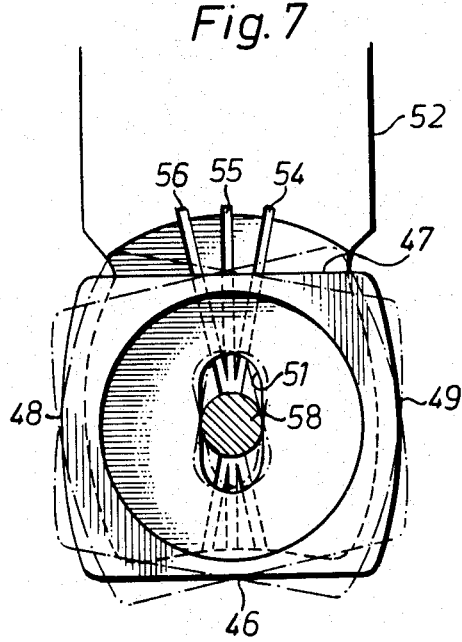
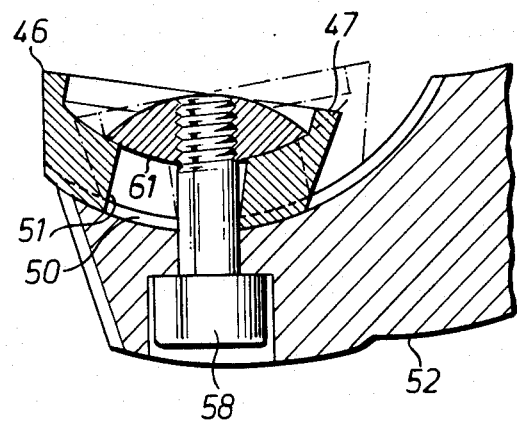

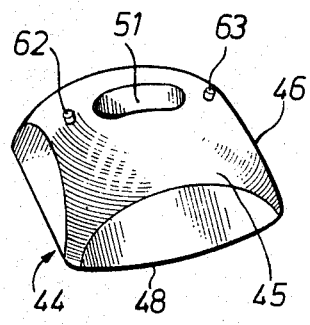
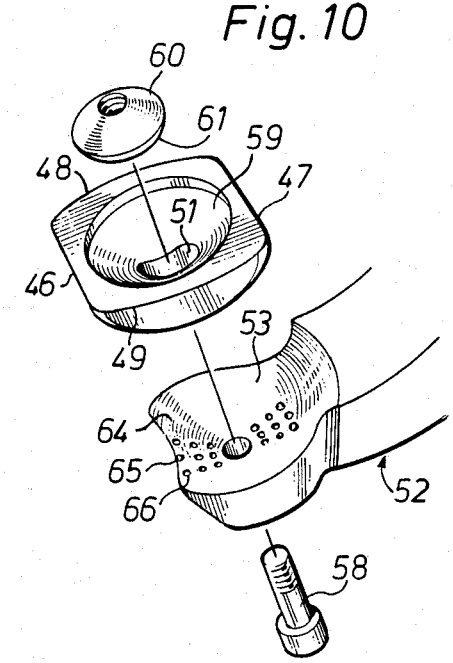
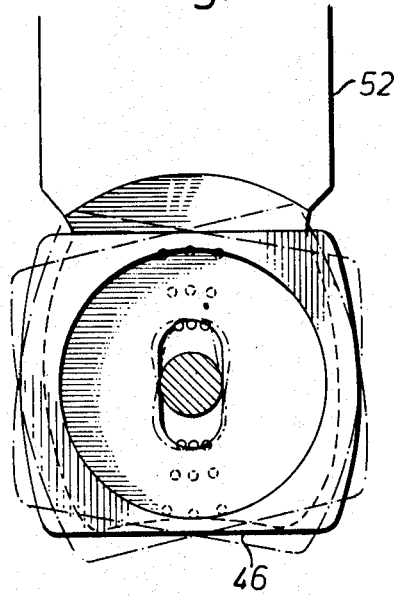
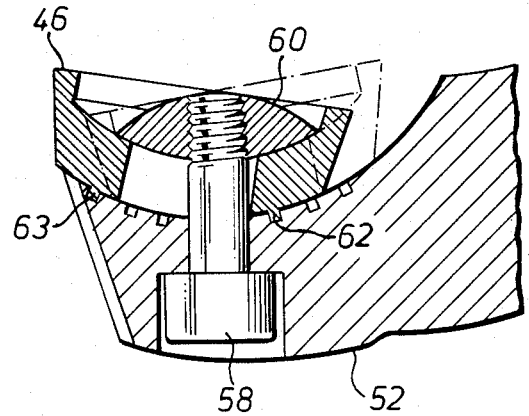

DEBARKING TOOL AND ARM COMBINATION

BACKGROUND OF THE INVENTION

1. Field of the Invention

The present invention generally relates to a device for debarking logs. More particularly the present invention concerns a debarking tool, a debarking arm for a debarking device, and a debarking tool and arm combination for use in a debarking device.

2. Description of the Prior Art

U.S. Pat. No. 4,231,406, granted to the present applicant, discloses a cutting tool and arm assembly which is used in debarking machines of the hollow rotor type. The tool, which is sold under the Registered Trademark PYRAMO, has an outer surface at least partially in the shape of a pyramid which is adapted to engage a correspondingly shaped recess in the free end of a debarking arm in order to make the tool nonrotational relative to the arm when secured in the recess. However, this prior art tool has one drawback, i.e., that the working edge thereof has its position permanently fixed. Thus, it is not possible to make the edge more or less aggressive, i.e. to alter the inclination of the edge relative to the arm, and to the surface of the logs to be treated.

Thus, it is an object of the present invention to provide a debarking tool which lets itself be positioned in several positions each giving the working edge of the tool a different inclination relative to a debarking arm and the log to be treated.

It is also an object of the present invention to provide a debarking arm for a debarking device which is provided with means for positively securing the debarking tool in a chosen set position.

A further object of the present invention is to provide a debarking tool and arm combination for a debarking device which allows the tool to be positively positioned in a chosen one of a plurality of possible setting positions.

SUMMARY OF THE INVENTION

According to the present invention, there is provided a debarking tool having a bearing surface adapted to be engaged by a tool carrier, said bearing surface having at least partly the shape of a portion of a surface of revolution. Means are also provided for guiding the setting movement of the tool in a direction along the periphery of said surface of revolution. Preferably, means may be provided for preventing rotation of the tool about the rotational axis of said surface of revolution when the tool is attached to a debarking arm of a debarking device.

According to the present invention, there is also provided a debarking arm for the debarking machine, said arm having in its free end a seat for a debarking tool, said seat having at least partly the shape of a portion of a surface of revolution. Means are provided for guiding a debarking tool relative to the seat when moved along said surface of revolution. Preferably, means are provided for preventing movement of the tool along said surface of revolution when attached to said seat.

According to the present invention, there is additionally provided a debarking tool and arm combination for use in a debarking device, said tool having a bearing surface and said arm a seat for receiving said tool, said surface and seat having portions of equal curvature such that the tool may be rotationally positioned in different positions relative to the seat. Furthermore, the tool and seat have cooperating guide means for relatively guiding the tool and the seat when the tool is rotated in said seat. Preferably the tool and the seat also have cooperating means for preventing rotation of the tool relative to the seat when attached to said seat in a chosen setting position.

DESCRIPTION OF THE DRAWINGS

The inventive ideas given above will be more clearly understood from the following description of preferred embodiments of the invention, with reference being made to the accompanying drawings, wherein:

FIG. 5 is a perspective view from underneath the tool according to a second embodiment of the present invention;

FIG. 6 is an exploded perspective view of the tool of FIG. 5 and the free end of an arm according to the second embodiment of the present invention;

FIG. 7 is a plane view showing in an enlarged scale, the tool and arm of FIG. 6 in an assembled position, with alternative positions being shown with dot-dash lines;

FIG. 8 is a central section through the tool and arm according to FIGS. 6 and 7;

FIG. 9 is a perspective view from underneath of a tool according to a third embodiment of the present invention;

FIG. 10 is an exploded perspective view of the tool of FIG. 9 and the free end of an arm according to a third embodiment of the present invention;

FIG. 11 is a plane view showing, in an enlarged scale, the tool and arm of FIG. 10 in an assembled position, with two alternative positions being shown with dot-dash lines; and FIG. 12 is a central section through the tool and arm according to FIGS. 10 and 11.

DETAILED DESCRIPTION OF THE INVENTION

Figure 1:
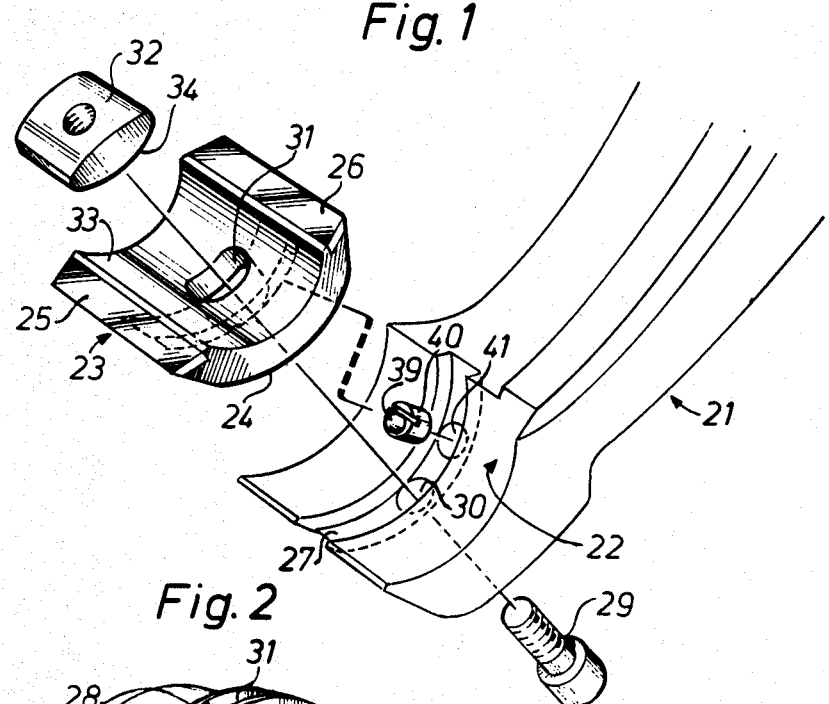
FIG. 1 is an exploded perspective view of a tool and the free end of an arm according to a first embodiment of the present invention.
Figure 2:
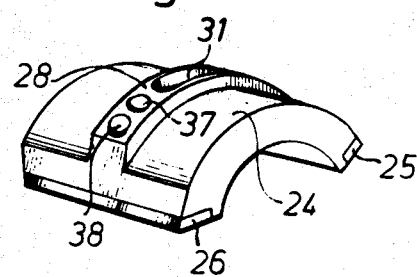
FIG. 2 is a perspective view of the tool of FIG. 1 seen from underneath.

Referring to FIGS. 1–4 of the drawings, a first embodiment of the invention will now be described. In the free end of a conventional debarking arm 21 is formed a recess 22 having the shape of a portion of a cylinder. The recess 22 forms a seat for a debarking tool 23 having an outer cylindrical bearing surface 24 corresponding to recess 22. Tool 23 has two edges 25 and 26 and may be positioned in seat 22 with either edge protruding from the free end of arm 21 so as to engage a log to be debarked. As is evident, since the curvatures of seat 22 and tool 23 are coaxial when assembled, tool 23 may rotate within seat 22 so as to vary the angle of the working edge relative to the surface of a log to be debarked. In order to guide such rotational movement of the tool 23, the seat 22 is provided with a central groove 27 and the tool with a corresponding ridge 28. In order to arrest the tool in a chosen position of rotation a screw 29 extending through a hole 30 in arm 21 may be introduced through an elongate hole 31 in tool 23 and tightened by means of a nut 32. Preferably, the tool 23 has a cylindrical inner surface 33 and the nut 32 a corresponding cylindrical abutting surface 34 so as to enable rotation of the tool with only a slight loosing of the screw and nut.

In order to set the tool 23 in a number of predetermined positions, indentations 35, 36, 37, 38 are formed along the ridge 28, two on each side of hole 31, and a knob 39 protrudes from the bottom of the groove 27 and is adapted to engage any of indentations 35-38. The knob 39 is eccentrically located on a cylindrical body 40 which is rotatable within a hole 41 in the bottom of groove 27. Preferably, body 40 has a slot 42 for engagement by a screw driver or other tool for rotating body 40. In order not to lose the rotating body 40 when changing or turning tool 23, a screw 43 extending through arm 21 may be threaded into the rotating body 40.

Figure 3:
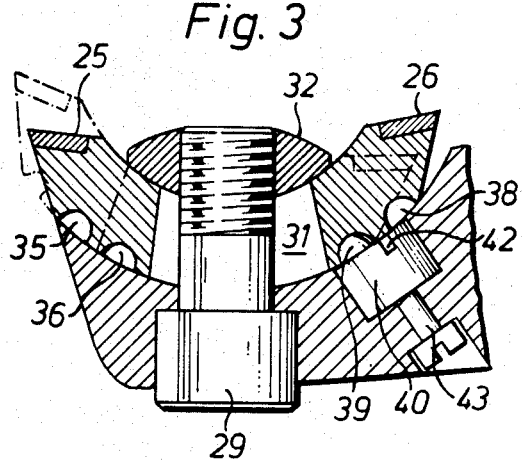
FIGS. 3 and 4 are central sections at an enlarged scale taken through the tool and arm according to FIG. 1 and showing the tool in different setting positions.
Figure 4:
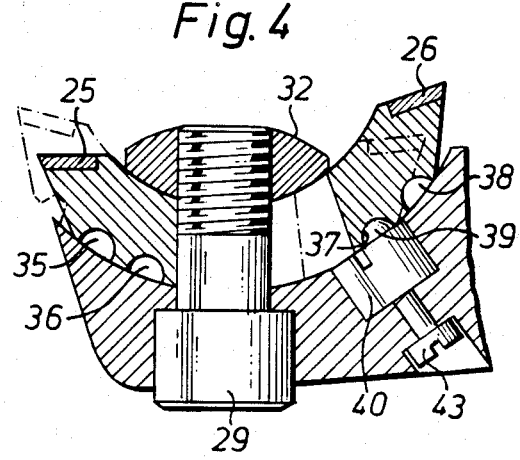

In FIGS. 3 and 4 are shown the four different setting positions for each edge of tool 23 that can be accomplished. In FIGS. 3 and 4 edge 25 is the working edge. In FIG. 3 knob 39 is shown in a first position being engaged in indentation 37, thus giving tool 23 the position shown in the full lines. In FIG. 4, knob 39 is shown in a second position, rotated through 180° relative to the position of FIG. 3, and also engaged in indentation 37, thus giving tool 23 the position shown in full lines which is the position where the edge 25 forms the smallest possible angle with the free end of arm 21 and, thus, with a log to be barked. In this position, the edge is the least aggressive. By rotating the body 40 through 180° relative to the respective position of FIGS. 3 and 4, two further tool positions can be established, these two positions being showed in dot-dash lines, the position of FIG. 3 being the most aggressive of tool 25.

It is readily appreciated that—after turning tool 23 through 180°, edge 26 can be set in either of the four positions described using indentations 35 and 36.

FIGS. 5-8 show a second embodiment of the invention wherein the tool and the seat therefor have corresponding spherical surfaces. A debarking tool 44 is shown in FIG. 5 having a partially-spherical bearing surface 45, two cutting or debarking edges 46 and 47, and two climbing edges 48 and 49. As is well known in the art, the climbing edges serve to engage the forward end of a log being advanced through a debarking machine so as to swing out the debarking arms into their operating position. A guide ridge 50 extends centrally over bearing surface 45 between debarking edges 46 and 47. An elongate hole 51 having the longitudinal direction of guide ridge 50 is formed through tool 44.

FIG. 6 shows the tool of FIG. 5 and a debarking arm 52, the free end of which having a recess 53 with a partial-spherical shape corresponding to the shape of bearing surface 45 of tool 44. The recess forms a seat for the tool 44 and is provided with three grooves 54, 55, 56 intersecting in the central portion of seat 53 and having widths adapted to receive the ridge 50 of tool 44. A hole 57 extending through arm 52 and opening in the common point of intersection between grooves 54, 55, 56 serves to receive a screw 58 which is adapted to pass through hole 51 in tool 44. Tool 44 has a partially-spherical inner surface 59 concentric to its bearing surface 45. A circular nut 60 having a spherical bottom surface 61 corresponding to inner surface 59 is adapted to receive screw 58.

As is evident from the above description and as appears from FIGS. 7 and 8, the tool 44 can be placed in seat 53 with its guide ridge engaged in either of grooves 54, 55, 56 whereby the working edge can be presented as having one of three possible inclinations against the longitudinal direction of arm 52. In FIG. 7, the tool is positioned in its center or neutral position defined by groove 55 and as shown by the full lines. The positions defined by grooves 54 and 56 are shown in dot-dash lines. By sliding tool 44 along the groove chosen, the working edge can be given a more or less aggressive angle. In FIG. 8 the tool is shown in full lines positioned with its edge 46 in its most aggressive position as defined by the extension of elongate hole 51, and in dot-dash lines in its least aggressive position. By tightening the nut 60 and screw 58 extending through holes 57 and 58, the tool may be fixed in a position chosen along either of grooves 54, 55, 56.

FIGS. 9-12 show an embodiment of the present invention resembling that of FIGS. 5-8 in so far that the tool and its seat in the debarking arm have corresponding, partially-spherical surfaces. Parts of the tool and the arm that are identical to the other figures have been given the same reference numerals. The important difference resides in that the tool is not provided with an extended ridge but rather two discrete protrusions 62 and 63 symmetrically located on either side of elongate hole 51 in its longitudinal direction. Correspondingly, the seat 53 has three intersecting rows 64, 65 and 66 of discrete indentations or impressions, each row containing three impressions on either side of hole 57. As apparent from FIGS. 11 and 12, the tool can be positioned with its working edge 46 in three differently inclined positions (FIG. 11) each corresponding to a row 64, 65, 66 of impressions, and three different aggressive positions (FIG. 12), each corresponding to the location of two impressions along a chosen row 64, 65, 66.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A debarking device comprising:
   a debarking tool and a debarking arm, said debarking arm being adapted to receive said debarking tool, said debarking tool having a curved bearing surface and said debarking arm being provided with a recessed seat for receiving said debarking tool, said recessed seat having substantially the same radius of curvature as said bearing surface;
   guide means provided in the bearing surface of said debarking tool and in said recessed seat of said debarking arm whereby the debarking tool can be located in different positions relative to said recessed seat, and
   means for fixing said debarking tool to the recessed seat of said debarking arm,
   wherein said guide means comprises a ridge means and a groove means which are provided in the bearing surface of said debarking tool and in the recessed seat of said debarking arm,
   wherein the ridge means extends from the peripheral surface of the debarking tool and said groove means comprises at least one groove provided in said curved surface of the recessed seat,
   wherein said curved bearing surface and said recessed seat are spherical, and said groove means comprises a plurality of intersecting grooves which radially extend across said recessed surface.

2. A debarking device comprising:
a debarking tool and a debarking arm, said debarking arm being adapted to receive said debarking tool, said debarking tool having a curved bearing surface and said debarking arm being provided with a recessed seat for receiving said debarking tool, said recessed seat having substantially the same radius of curvature as said bearing surface;
guide means provided in the bearing surface of said debarking tool and in said recessed seat of said debarking arm whereby the debarking tool can be located in different positions relative to said recessed seat, and
means for fixing said debarking tool to the recessed seat of said debarking arm,
wherein said guide means comprises a ridge means and a groove means which are provided in the bearing surface of said debarking tool and in the recessed seat of said debarking arm,
wherein said ridge means extends from the peripheral surface of the debarking tool and said groove means comprises at least one groove provided in said curved surface of the recessed seat,
wherein said curved bearing surface and said recessed seat are cylindrical,
a plurality of indentations positioned along said ridge means, and
a knob means located in said groove means and extending from the bottom thereof to selectively engage one of said plurality of indentations.

3. A debarking arm for use in a debarking machine, said arm having at its free end a recessed seat for receiving a debarking tool, said seat having the shape of a portion of a surface of revolution,
wherein said surface of revolution is a concave shaped surface,
wherein said seat has guide means for guide setting of said tool in a direction along the periphery of said surface of revolution, and
wherein said guide means includes a plurality of intersecting grooves extending along the periphery of said surface of revolution.

4. A debarking arm for use in a debarking machine, said arm having at its free end a recessed seat for receiving a debarking tool, said seat having the shape of a portion of a surface of revolution,
wherein said surface of revolution is a cylindrical surface,
wherein said recessed seat has guide means for guide setting of said tool in a direction along the periphery of said surface of revolution,
wherein said guide means include at least one groove extending along the periphery of said surface of revolution, and
including indexing means for fixing said tool in predetermined setting positions, said indexing means comprising a protrusion located in said groove.

5. The debarking arm according to claim 4, wherein said protrusion is adjustable in two setting positions.

6. A debarking arm for use in a debarking machine, said arm having at its free end a recessed seat for receiving a debarking tool, said seat having the shape of a portion of a surface of revolution,
wherein said surface of revolution is a cylindrical surface,
wherein said seat has guide means for guide setting of said tool in a direction along the periphery of said surface of revolution,
wherein said guide means includes a plurality of intersecting rows of indentations.

7. A debarking device comprising:
a debarking arm provided with a curved recessed seat;
a debarking tool, provided with a cutting edge, having a curved bearing surface rotatably disposed within said recessed seat of said arm, said bearing surface being provided with a plurality of indentations;
means for retaining said tool within said curved recessed seat of said arm and for locking said tool in position with respect to said arm; and
a protrusion extending from said recessed seat of said arm for cooperating with one of said indentations of said tool for setting said tool orientation with respect to said arm.

8. The debarking device according to claim 7, wherein said protrusion is adjustable in position with respect to said recessed seat.

9. The debarking device according to claim 7, wherein said recessed seat of said arm and said bearing surface of said tool are cylindrically shaped and said debarking device including guide means for allowing rotation of said tool with respect to said arm without lateral movement during an adjustment operation and for providing a lateral restraint from forces exerted on said tool during operation of said tool.

10. The debarking device according to claim 8, wherein said protrusion is provided and eccentrically located on a rotatable member disposed within said arm for allowing adjustment of the position of said protrusion with respect to said recessed seat of said arm.

11. The debarking device according to claim 9, wherein said protrusion is provided and eccentrically located on a rotatable member disposed within said arm for allowing adjustment of the position of said protrusion in a circumferential direction of said recessed seat.

12. The debarking device according to claim 10, wherein said rotatable member is provided with a slot for rotation by a screw driver for adjustment of the position of said protrusion.

13. The debarking device according to claim 11, including a locking screw disposed within a hole in said arm and threaded into said rotatable member for locking it in place.

14. The debarking device according to claim 11, wherein said rotatable member is provided with a slot for rotation by a screw driver for adjustment of the position of said protrusion.

15. The debarking device according to claim 14, including a locking screw disposed within a hole in said arm and threaded into said rotatable member for locking it in place.

16. The debarking device according to claim 7, wherein said tool is provided with a through slot and said retaining means comprises a bolt extending through a hole in said arm through said slot in said tool and threaded into a nut.

17. The debarking device according to claim 9, wherein said tool is provided with a through slot oriented in the circumferential direction of said bearing surface of said tool with said plurality of indentations positioned on either side and in alignment with said slot.

18. The debarking device according to claim 17, wherein said protrusion is provided and eccentrically located on a rotatable member disposed within said arm for allowing adjustment of the position of said protrusion in a circumferential direction of said recessed seat.

19. The debarking device according to claim 9, wherein said guide means comprises a cylindrical shaped slot in said recessed seat of said arm engaging with a cylindrical shaped ridge extending from said bearing surface of said tool.

20. A debarking device comprising:
   a debarking arm provided with a concave shaped recessed seat;
   a debarking tool, provided with a cutting edge, having a convex shaped bearing surface adjustably disposed within said recessed seat of said arm; and
   means of retaining said tool within said recessed seat of said arm and for locking said tool in position with respect to said arm.

21. The debarking device according to claim 20, including guide means for allowing guided adjustment of said tool with respect to said arm before locking said tool with respect to said arm.

22. The debarking device according to claim 21, wherein said guide means comprises a plurality of intersecting grooves in said concave shaped recessed seat of said arm and a ridge is provided on said convex shaped bearing surface of said tool for cooperating with a selected one of said grooves.

23. The debarking device according to claim 20, wherein said tool has a substantially square shaped upper face for providing four cutting edges.

24. The debarking device according to claim 20, wherein said retaining means comprises a bolt extending through a hole in said arm and through a through slot in said tool with a nut disposed within a recess in said tool being threaded onto said bolt.

25. The debarking device according to claim 20, wherein said convex shaped bearing surface is provided with at least one protrusion for cooperating with one of a plurality of indentations provided in said concave shaped recessed surface of said arm for setting the orientation of said tool with respect to said arm.

26. The debarking device according to claim 24, wherein said recess in said tool is concave shaped and said nut is convex shaped for allowing adjustment of said tool relative to said arm.

27. A debarking device comprising:
   a debarking arm provided with a curved recessed seat, said curved recessed seat provided with a plurality of indentations;
   a debarking tool, provided with a cutting edge, having a curved bearing surface rotatably disposed within said recessed seat of said arm;
   means for retaining said tool within said curved recessed seat of said arm and for locking said tool in position with respect to said arm; and
   at least one protrusion extending from said curved bearing surface of said tool for cooperating with at least one of said indentations in said curved recessed seat of said arm for setting said tool orientation with respect to said arm.

28. The debarking device according to claim 27, wherein said tool has a substantially square shaped upper face for providing four cutting edges.

29. The debarking device according to claim 27, wherein said retaining means comprises a bolt extending through a hole in said arm and through a through slot in said tool with a nut disposed within a recess in said tool being threaded onto said bolt.

30. The debarking device according to claim 27, wherein said bearing surface convex shaped and said recessed surface of said arm is concave shaped.

31. The debarking device according to claim 29, wherein said recess in said tool is concave shaped and said nut is convex shaped for allowing adjustment of said tool relative to said arm.

* * * * *